United States Patent [19]

Lemelson

[11] 4,043,721
[45] Aug. 23, 1977

[54] COMPOSITE BODY MOLDING APPARATUS

[76] Inventor: Jerome H. Lemelson, 85 Rector St., Metuchen, N.J. 08840

[21] Appl. No.: 547,621

[22] Filed: Feb. 6, 1975

Related U.S. Application Data

[63] Continuation of Ser. No. 300,248, Jan. 24, 1972, Pat. No. 3,875,273, which is a continuation of Ser. No. 744,048, July, 1968, abandoned.

[51] Int. Cl.$^2$ .................... B29C 5/04; B29C 27/00
[52] U.S. Cl. ..................... 425/116; 425/4 R; 425/120; 425/129 R; 425/144; 425/145; 425/435; 425/577
[58] Field of Search ............... 425/120, 4 R, 121, 144, 425/123, 145, 124, 116, 129, 242 R, 429, 435, 348 R, 348 S

[56] References Cited

U.S. PATENT DOCUMENTS

| 447,455 | 3/1891 | Bartlett | 425/435 |
|---|---|---|---|
| 2,349,213 | 5/1944 | Van Niekerk | 425/435 X |
| 3,041,699 | 7/1962 | Daniel | 425/435 X |
| 3,366,993 | 2/1968 | Lemelson | 425/181 X |
| 3,412,431 | 11/1968 | Lemelson | 425/116 X |
| 3,416,193 | 12/1968 | Freeborn | 425/435 X |

*Primary Examiner* — Robert L. Spicer, Jr.

[57] ABSTRACT

An apparatus is provided for molding composite articles by first rotationally molding a shell-like body with a reinforcing member or frame extending through the body and supported by the walls of a mold. The hollow shell is formed of a liquid or powdered resin or other suitable material disposed in the mold per se or containing reinforcing elements which become encapsulated within the molding material. A second molding material may be injected into the hollow shell to partly or completely fill the volume interior thereof. The second material may comprise a resin containing a blowing agent which causes the resin to expand and form a cellular mass filling the hollow body or forming a shell thereagainst as the mold is rotated. The filler material may be introduced through one or more of the reinforcing members disposed within or across the mold cavity.

In another form of the invention, hot and/or cold gases may be injected into the interior of a rotational mold containing a molding material so as to react on the molding material and transfer heat thereto or receive heat therefrom so as to accelerate or effect the setting or solidifying of the material in situ against the wall of the mold or a previously deposited material. The alternate injection or spraying of molding materials and gases into the mold may be employed to form composite hollow or solid articles of predetermined compositions and physical characteristics.

16 Claims, 11 Drawing Figures

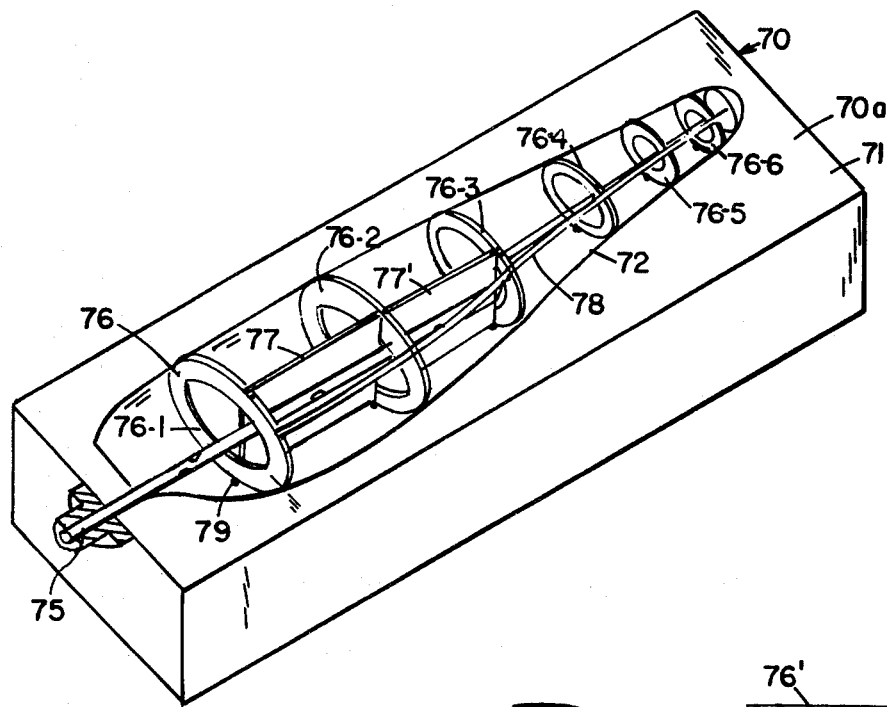
Fig. 6
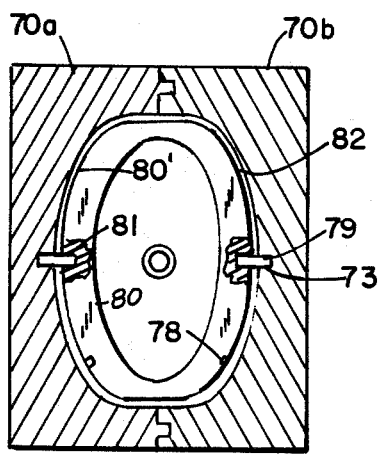
Fig. 7
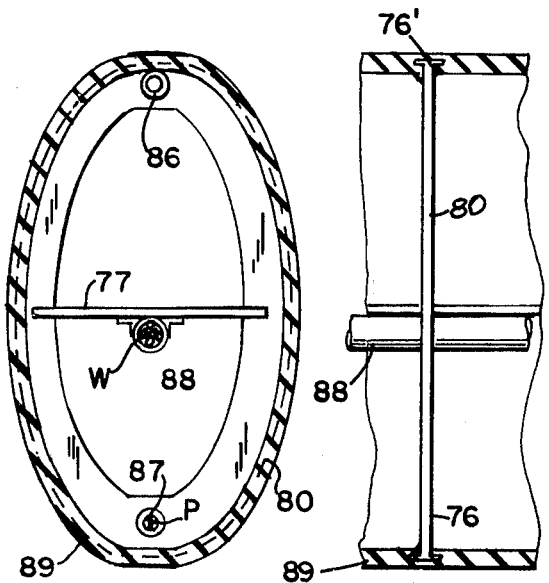
Fig. 8
Fig. 9

COMPOSITE BODY MOLDING APPARATUS

RELATED APPLICATIONS

This is a continuation of application Ser. No. 300,248, now U.S. Pat. No. 3,875,273 filed Oct. 24, 1972 for Composite Body Molding Apparatus and Method, as a continuation of Ser. No. 744,048 filed July 11, 1968, now abandoned.

SUMMARY OF THE INVENTION

This invention relates to an apparatus and method for producing composite articles by molding materials such as synthetic resins which are distributed during the molding process by rotation or otherwise moving the mold.

It is known in the art to produce hollow objects by rotating a mold after a measured quantity of molding material has been disposed in the mold cavity and causing said molding material to solidify in situ against the wall of the mold cavity to form a hollow object. Heretofore, limitations as to the applications and sizes of hollow objects produced by rotational molding have resulted from the lack of stiffness of the molding material and the lack of internal support for the hollow molding. In the production of certain hollow objects such as toys, internal support for the molding has been provided by securing one or more members within the hollow object after the molding thereof. In one of the parent applications hereof, Ser. No. 281,306 [now U.S. Pat. No. 3,364,292], a method is provided for forming a hollow object by rotational molding wherein an internal support means such as a strut or frame is prepositioned across the mold cavity prior to molding and becomes an integral part of the hollow object formed during the rotational molding process. The instant invention defines an apparatus and method which are improvements over the technique defined in U.S. Pat. No. 3,364,292, in that the internal support may serve a variety of new and useful functions both during the molding procedure and after the composite article is molded. is molded. Furthermore, by employing the apparatus and method defined herein, composite, seamless hollow objects may be rotationally molded which are partially or totally filled with a core or support material dispensed directly from the internal support means serves as a conduit therefore.

Accordingly, it is a primary object of this invention to provide a new and improved apparatus and method for molding hollow, internally reinforced articles.

Another object is to provide a rotational molding apparatus which is operable to permit charging of the mold with molding material after it is closed and the introduction of a plurality of different molding materials into the mold to provide hollow articles thereof.

Another object is to provide an apparatus and method for molding composite articles by rotating a mold and forming a first material into a hollow shell, then rotating the mold while forming a second material to shape within the outer shell.

Another objects is to provide an apparatus and method for rotationally molding a first material to form a hollow body and thereafter expanding a cellular plastic in situ within said hollow body to complete the molding procedure and form a core support for the hollow body.

Another object is to provide a new and improved rotational molding apparatus having means for introducing a heat transfer fluid into the interior of a rotationally molded body for rapidly melting or curing the molding material and, in certain instances, rapidly cooling same so as to reduce the molding cycle time.

Another object is to provide an improved method for rotational molding by introducing a hot gas or vapor into the mold during the molding operation.

Another object is to provide a new and improved article of manufacture such as aircraft wings, bodies and the like which are formed at least in part by rotational molding and are internally supported during the molding procedure by one or more objects or materials disposed within the mold.

With the above and such other objects in view as may hereinafter more fully appear, the invention consists of the novel construction, combination and arrangement of parts and procedures which will be hereinafter more fully described and illustrated in the accompanying drawings, wherein are shown embodiments of this invention and it is to be understood that changes, variations and modifications may be resorted to which fall within the scope of the invention as claimed.

Figure 1:
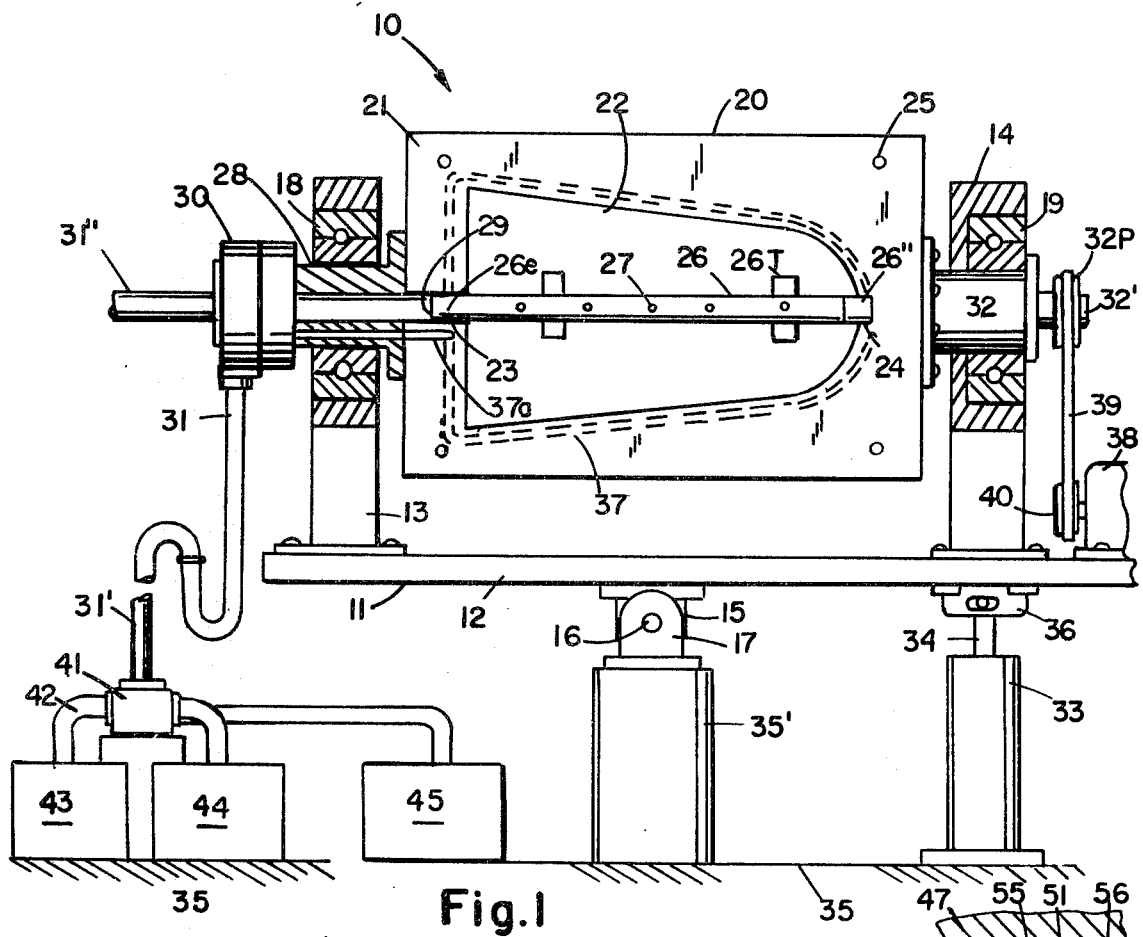
FIG. 1 is a side view with parts removed and sectioned for clarity, of a rotational molding apparatus defining the instant invention.
Figures 2, 3:
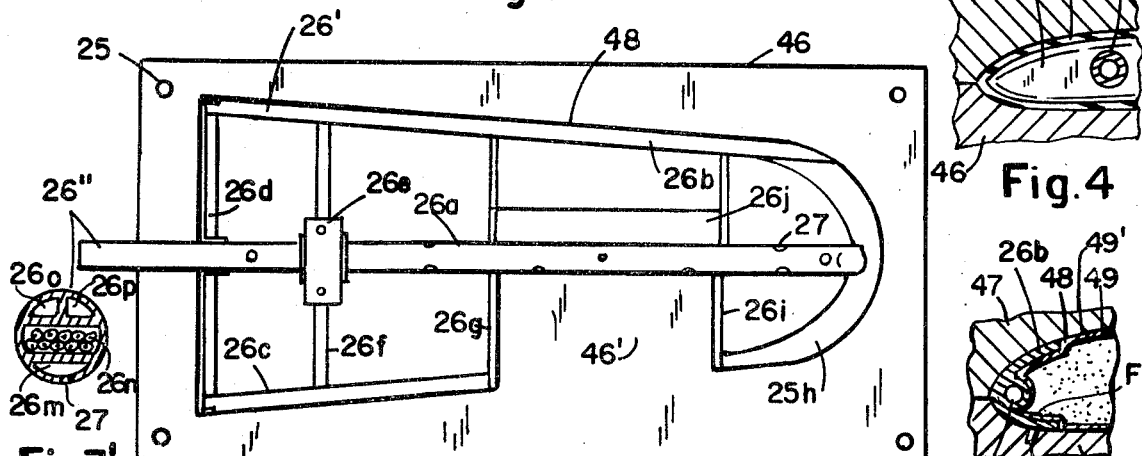
FIG. 2 is a side view of the open face of a modified form of mold applicable to the apparatus of FIG. 1 and a preform disposed within the mold.
Figure 3:
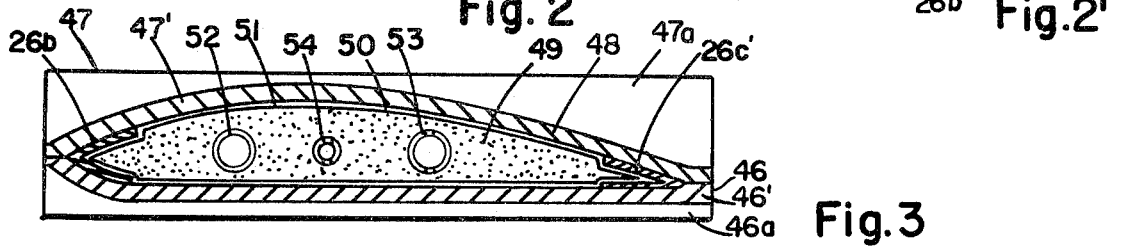
Figure 5:
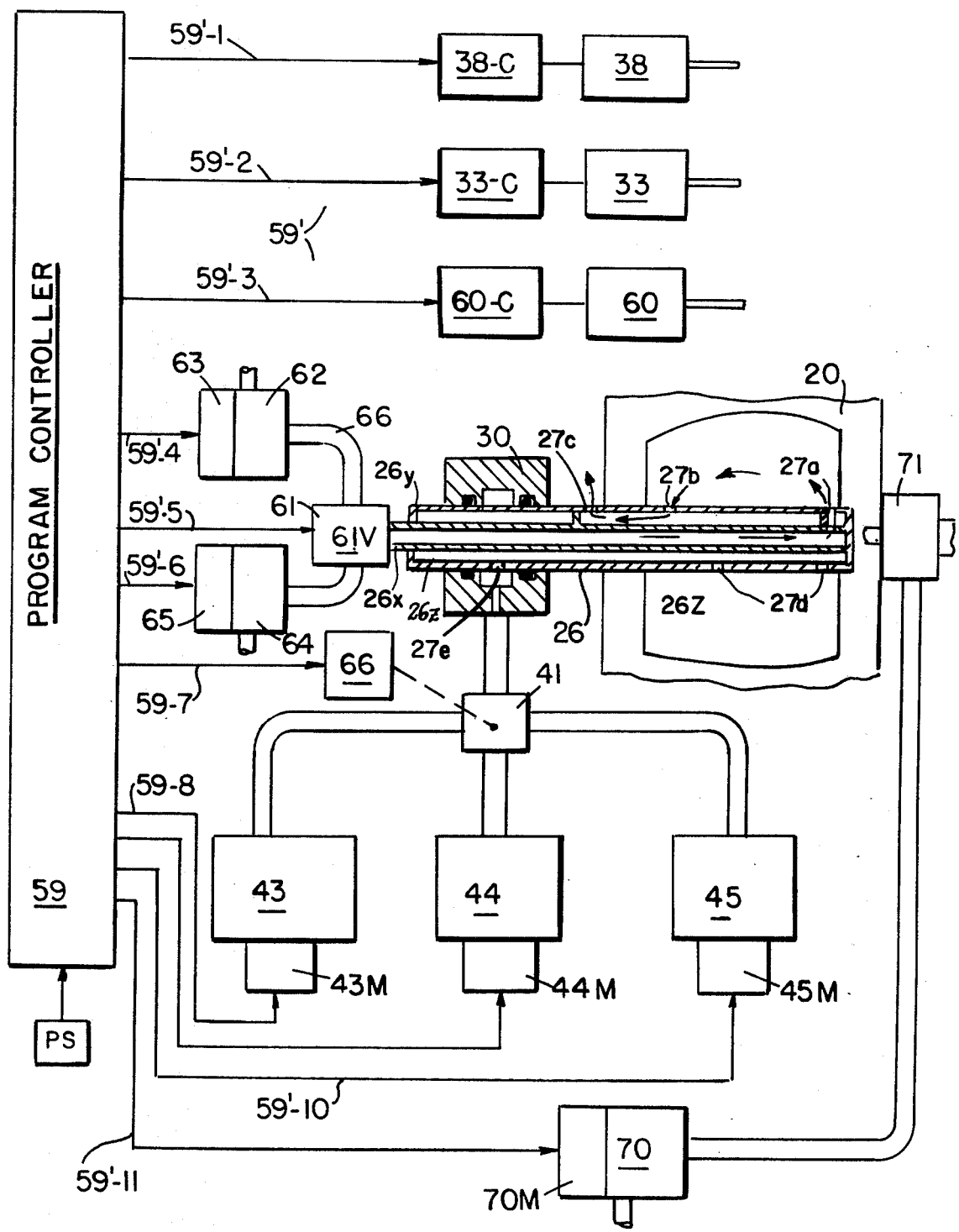

FIG. 2' is a fragmentary view in cross section of a portion of the mold of FIG. 2;

FIG. 3 is a chordwise view in cross section of a modified form of a wing mold of the type shown in FIG. 2;

FIG. 4 is a cross sectional view of a fragment of a modified form of wing mold;

FIG. 5 is a block diagram illustrating control components for an apparatus of the type shown in FIG. 1.

FIG. 6 is an isometric view of a modified mold assembly;

FIG. 7 is a cross sectional view of the mold of FIG. 6;

FIG. 8 is a cross sectional view of a composite molding made in the mold of FIGS. 6 and 7 and FIG. 9 is a side cross sectional view of the molding.

There is shown in FIG. 1 a rotational molding apparatus 10 for molding large, hollow or filled composite articles of a plurality of different molding materials. Such molding materials may vary in composition depending upon the requisite structure being molded to include one or more conventional thermosetting or thermoplastic resins, reinforced resins, foamed plastic materials, ceramics and, in certain instances, metals or metal composites. They may be introduced sequentially into the cavity of the mold or, in certain instances, simultaneously in a predetermined manner so as to produce a molded article or predetermined physical characteristics.

The molding apparatus 10 includes a mold 20 made of two or mold parts, one 21 of which, is shown having a molding cavity 22 and provided with alignment pins 25 in the face of the mold for aligning and holding another mold part (not shown) therewith to provide a substantially totally enclosed molding cavity which may be rotated and oscillated to predeterminately distribute molding material about the surface of the mold to form the hollow body. In other words, the alignment pins 25 are adapted to slidably engage in holes in the face of the mating mold part which is not assembled with part 21 in FIG. 1 for the purposes of illustrating details of the mold interior and components assembled therewith.

Extending completely across the mold cavity 22 and supported by the walls of sub-cavity extensions 23 and 24 of said main cavity 22, is a rigid tube or pipe 26 having holes 27 communicating with the interior or said pipe through which holes molding and/or heat transfer material may flow prior to and, in certain instances during the rotational molding procedure. The pipe 26 thus may serve a plurality of purposes including, in addition to that of admitting one or more fluids to the mold cavity to effect or improve the molding procedure, the functions of reinforcing the molded article not only during the molding procedure but also as a permanent strut reinforcement therefore during the use of the article and, in certin instances, one or more additional useful and important functions. The end portion 26' of tube 26 which protrudes from one end of the molding by virtue of is extending into the sub-cavity 23, may serve to attach the molding to another assembly. For example, if the mold cavity 22 molds an aircraft flight structure such as a wing, stablizer or rudder in the mold while the tubular member 26 may serve as rigidizing means for said flight structure and a portion 26' extending from the end wall of the molding may serve to join said flight structure or wing to an aircraft body or other component. The tube 26 may also serve as a fluid transfer medium for the molded article during use such as means for transmitting heat transfer fluid to the molding to cool and/or heat same during use of for transmitting a pneumatic or hydraulic fluid to operate one or more fluid devices such as a lineal actuator, motors, or fluid amplifiers connected to or encapsulated within the molding for performing one or more functions. The hollow tubular member 26 may also serve as a means for holding one or more electrical wires or electrical components such as motors, actuators or switching elements mounted therein, adjacent thereto or in another component to which the molding is attached. In still another useful application of the tubular member 26, it is noted that it may serve as a base or support for one or more articles or assemblies or as a means for attaching objects to the molding. For example, if the molding which is fabricated in the cavity 22 is an aircraft wing, the tubular member 26 or a modified form thereof such as an assembly of tubes, may serve as means for attaching a landing gear to the wing, control wires or the like for operating such landing gear, serve devices or actuators for operating a flight control device such as an aileron, wing flap, spoiler or the like.

Notation 26" refers to the other end of the tubular member 26 which protrudes into the sub-cavity 24 at the other end of the molding. The portion 26" of the tubular member may be retained, cut off or otherwise removed, depending on the configuration desired of the molding. In FIG. 1, the end portion 26" is removably secured to the end of tubular member 26 by friction fit or threading thereon so that the end of the wing or molding may have a smooth contour after removal of said end tubular portion. The opening remaining may be filled in with hardenable plastic material or another fitting such as a wing tip lamp may be secured in its place.

Secured to one end wall of the mold member 20 is a hollow bushing 29 which is supported in a bearing 18 which is supported by a mount 13 such as an elongated pillow block secured to a platform 12 to provide rotational support for the mold. Secured to the other end of the mold member 21 is a shaft or pin 32 which may or may not be hollow, and which member 32 is supported in a ball or roller bearing 19 supported by a second elongated pillow block 14 which is mounted on the platform 12. The end portion 32' of the shaft 32 supports a pulley or gear 32P about which is driven a belt 39 which winds around a pulley 40 secured to the shaft of a motor 38 also supported on the platform 11.

The platform 12 may be oscillated to change the attitude of the axis of rotation of the mold to properly distribute molding material about the mold cavity. A pillow block 15 is secured to the bottom of the platform 12 and the bearing of said pillow block supports a shaft or pin 16 which is supported by a yoke 17 mounted on a base or frame 35' supported by the ground or main frame 35 of the machine. A hydraulic cylinder 33 supported by the main frame 35, has its output shaft 34 pinned and retained in a slotted receptacle or bracket 36 secured to the bottom of the platform 12 at some distance from the location of the pillow block 15 so that projection and retraction of the shaft 34 of the cylinder 33 will serve to tilt the platform 12 about the axis with pin 16 thereby changing the attitude of the axis of rotation of the mold 20 for a proper distribution of the molding material about the mold cavity during at least part of the molding process.

As stated, molding material may be initially charged into the mold cavity 22 while the mold parts are separated either by pouring into the open mold or forcing same through the openings 27 in the tubular member 26. Shown in FIG. 1 is a rotary coupling 30 secured to the end of the hollow bushing 28 and connecting an inlet conduit 31 containing one or more passageways for the conduction of one or more molding fluids and, in certain instances, other fluids which serve to heat, cool or otherwise cure the molding material admitted to the mold cavity. The end 26e of the tubular member 26 is open and communicates with the interior passageway 29 of the bushing 28 which bushing is shaped with a radial openings (not shown) to the passageway 29 communicating with the stationary portion of the rotary coupling 30 so that fluid may be flowed in either direction between the passageway 29 of the bushing and the conduit 31. The conduit 31 is flexible permitting it to deflect as the platform 12 is tilted and said conduit connects at its lower end 31' to a valve 41 for selectively connecting different inlets 42 connecting respective supply means 43, 44 and 45 of fluid material to the line 31 for admitting different fluids to the mold cavity. As stated, the supply means 43–45 may each include a pump or other means for pressurizing a molding material, upon command, and causing said material to flow through the valve 41 into the mold in predetermined quantities for effecting predetermined molding operations. The valve 41 may be designed to admit fluid material from any one of the sources 43–45 thereof either in predetermined quantity per so or predetermined quantities of two or more of said materials.

Notation 31" refers to a second conduit which is shown axially connected through the rotary coupling 30 directly to the passageway 29 in the hollow bushing or shaft 28 for admitting either a molding material or a heat transfer fluid directly to the mold cavity 22 through the tubular member 26 or a heat transfer fluid such as a heated and/or cooled liquid or gas through an auxiliary passageway 29' in the bushing 28 which communicates with a passageway 37a in the mold wall which extends to a fluid conducting system 37 comprising a plurality of passageways disposed through the mold wall adjacent to the cavity 22 and operative to effect the rapid transfer of heat to and/or from molding material in the cavity for rapidly setting or hardening same.

It is noted that the described operational functions including the operation of mold rotating motor 38, platform tilting cylinder 33, solenoid operated valve 41, the motors operating the pumps located in material flow systems 43-45 and the means for emitting fluid to the conduit 31" may be predeterminately controlled by a single programming device such as a multi-circuit timer or variable program controller which is operative in such a way as to permit preprogrammed variation in the process variables to effect the molding of predetermined articles of manufacture and preprogrammed molding cycles. As a step towards complete automation, it is noted that an article transfer mechanism such as one or more article manipulators may be operative to (a) open the mold after molding, (b) remove the molded assembly from the mold, (c) place a new tubular member or assembly 26 across the mold cavity and predeterminately position same in the mold as illustrated and (d) reclose the mold so that the described molding procedure may progress thereafter. The molded assembly may be removed from the mold by a manipulator as defined in U.S. Pat. No. 3,272,347 which is operated by a master controller controlling the other molding variables as described so as to properly perform the described operations.

In FIG. 1, notation 26T refers to one or more fittings such as plates or flanges secured to the tubular member 26 and are operative to receive and fasten one or more devices or fixtures to the molding such as landing gear, actuators or serves for movable flight surfaces, wing flaps, fuel tanks, instrumentation and other devices.

During a typical molding operation, the apparatus of FIG. 1 may be operating first by introducing a suitable resin into the mold cavity 22, preferably through the conduit 26 disposed therein, and thereafter causing said resin to form a first hollow shell-like molding by properly rotating and oscillating the mold by the controlled operation of motor 28 and actuator 33, preferably while applying heat and/or other curing means to the mold or directly to the resin as will be described hereafter. A molten or liquid pro-mix of a resin such as polyester resin and reinforcing material such as glass, resinous, ceramic or metallic fibers may be injected through the inlet conduit 31, the interior of bushing 28 and the openings 27 into the mold cavity 22 in a predetermined quantity and thereafter caused to become distributed about the surface of the mold and to form a first hollow shell-like molding against the mold cavity wall. Hardening or setting of said first material will also be effected about the tubular member 26 in a manner to mechanically or adhesively secure said tubular member within the hollow molding by virtue of molding material being hardened and extending over and about those portions of the tubular member which are adjacent the walls of the mold cavity in the areas of the sub-cavities 23 and 24. After the first charge is introduced and hardened against the surface of the mold, additional charges of similar material or another material or materials are introduced into the mold and may be set or hardened therein while the mold is stationary or rotated and oscillated as described, depending on the desired characteristics of the finished composite article. For example, it may be desired to introduce further resin similar to that forming the initial shell, with or without reinforcements so as to build up the thickness of the wall of said shell. Or it may be desired to introduce a sufficient amount of the same resin or another resin to completely fill the interior of th originally molded shell disposed against the wall of the mold cavity. If weight is an important factor, the material introduced into the hollow space within the molding through one or more of the openings 27 in the tubular member 26 may comprise a resin adapted to expand or foam in situ within said volume and the quantity of said resin may be such as to permit it to completely fill said hollow volume without the need for further rotation or oscillation of the mold so as to provide a cellular core within the initially molded shell of predetermined density, the cells of the core material having a gas entrapped therein to provide a lightweight internal support for the hollow molding. Such self-expanding polymers as polystyrene, polyethylene, epoxy, polycarbonate, polyurethane and other resins may be injected into the mold mixed with a suitable blowing agent immediately prior to injection or such an agent introduced through a suitable conduit disposed within the tube 26 and mixed with the resin as it is admitted to the mold.

The apparatus of FIG. 1 is also subject to a number of other variations both in structure and operation which will permit the production of new and improved structures of composite molded articles. Certain of these include the following: I. The single illustrated straight pipe or tube 26 may be shaped other than that shown and may be tapered, bent or otherwise fabricated to conform to the hollow molding and/or other structures to be attached thereto or disposed within the mold. In other words, the single tube may be replaced by a plurality of tubes extending across the mold and secured in respective sub-cavities or retaining means at opposite ends of the molds or by an assembly of tubular and other members temporarily held within the mold as illustrated. In the fabrication of an aircraft wing, a plurality of tubes of struts may extend longitudinally through the mold per se and, in certain instances, may have lateral formations such as plates, struts or wing ribs attached thereto to reinforce the molded article, attach other articles thereto and/or to conduct fluids or guide electrical wires through the wing. II. Mechanical means may be disposed within the pipe 26 during molding or between molding operations to clear the openings 27 of th molding material or to prevent molding material from solidifying within and closing said openings. Such mechanical means may comprise rods, serve devices such as solenoids or motors, electrical vibrating or heat generating means, or gas jet generating means operative to blow a gas through the openings 27 to remove molding material therefrom. The pumping means provided in supply units 43, 44 and 45 may also be operative to initially transmit fluid material under high pressure to the pipe 26 so as to blow out the openings thereof prior to admitting the major portion of molding material to the mold after the initial operation.

In FIG. 2 is shown a modified form of mold section 46 containing a molding cavity 48 in which is disposed a skeletal structure 26' composed of a centrally disposed tubular member 26" which is connected to a leading edge strut 26b and a plurality of additional struts including a trailing edge strut 26c, a wing root strut or rib 26d and a wing tip member 26b. The tube 26" which may be rectangular or round, may be fabricated of aluminum, titanium or other suitable metal and has a plate 26e welded thereto and connected to the leading edge strut 26b, trailing edge strut 26c by means of a rod or rib 26f. The wing tip portion 26h extends to a rib or lateral rod 26i which is connected to the center tube 26" and the trailing edge 26e connects to the center tube 26" by means of a short rib or rod 26g. A portion 46' of the mold fills the void between the short ribs 26i and 26g which volume is void of molding material upon completion of the composite molding and may retain a movable member such as an aileron, flap or rudder element connected to the assembly of rods or pins extending through holes (not shown) in the members 26g and 26l. such an aileron or rudder may be actuated by one or more lineal fluid or electrical actuators disposed within the tubular member 26" at the portion 26a thereof or within one or more members or housings 26j attached to the other side of the tubular member as shown. The housing 26j and the actuators therein may be welded or otherwise supported by the tubular member 26" and/or by other structural members of the framework disposed within the mold prior to molding. Actuators or motors situated within said housing contain output means accessible through the wall of the housing and/or the tubular member 26" so as to permit the attachment of bell-cranks or push rods extending from the aileron or rudder inserted into the space between members 26g and 26i upon assembly of the molded wing or flight surface. Wires and/or fluidic piping for controlling the operation of said actuators or motors may extend through the member 26" from the end thereof beyond the root of the ring molding to be connected to wires and piping located in the fuselage of the airplane for controlling the operation of the rudder. Such wires or piping may be inserted into the tubular member 26" prior to its assembly in the mold and may extend parallel to one or more conduits or pipes located therein for conducting fluid materials such as molding materials to the mold cavity as described. Said interior pipes may be connected to respective of the openings 27 in the tubular member 26" by means of short lengths of tubing or other conduit means.

Upon assembly of the frame shown in FIG. 2 in the mold memer 46, a second mold member (not shown) assembled with the mold member 46 to define a molding cavity and the assembled mold member thereafter be operated as described in FIG. 1 by connecting the tubular member 26" to one or more sources of molding material and suitably rotating or otherwise moving the mold to distribute molding material about the cavity and the components located therein for properly forming the hollow molded first shell which may serve to comprise the entire molding or may serve as an outer casing about a core material such as the described cellular plastic material which is foamed in situ within the first molded shell.

In FIG. 2' is shown a modified form of the loading edge member 48 which is illustrated as secured within the mold member 46 by means of one or more fasteners F extending through the member 26b into threaded holes H in the wall of the mold cavity. The loading edge member 26b is shown as an extrusion having a tubular portion 26b' extending therealong for reinforcing said loading edge member and also for conducting a transfer fluid therethrough such as a heat transfer fluid operative to de-ice the wing and/or the hydraulic fluid for operating one or more components of the assembled wing such as an aileron, spoiler or wing flap. Suitable piping may be provided in the root spar 26d connecting the passageway and tubular section 26b' with a source of fluid located in the fuselage of the airplane. It is noted that the passageway 26b' may comprise a plurality of conduits or tubes running along the length of the strut 26', one of which may also be utilized to conduct the liquid fuel from a tank situated within the wing to the engine of the aircraft.

In the event that it is desired to attach one or more engines to the wing, more complex lateral and longitudinal bracing including struts and ribs may be attached to the tubular member 26" for effecting such motor assembly to the wing. Notation 47 in FIG. 2" refers to the upper mold half and 49 to core molding material disposed within the outer shell 49' molded against the wall of the mold cavity and the inside surfaces of the leading edge strut 26b.

In FIG. 3 is shown a modified form of two-piece mold having a lower mold half 46 and an upper mold half 47. Each mold half has respective pairs of end plates 46a and 47a secured to the main mold wall portions 46' and 47' which are substantially the contour of the ring molded therebetween. A leading edge spar 26b' and a trailing edge spar 26c' extend the length of the wing and are secured between the mold wall sections at the leading and trailing edges of the cavity. The outer shell or molding 51 extends completely along the mold cavity wall with the exception of those portions abutted by the loading and trailing edge spars 26b' and 26e' inside of which the shell 51 is molded during the rotational molding process. An expanded cellular plastic material fills the internal volume and defines core portion 49 of the molding. Three tubular members 52, 53 and 54 extend parallel to the longitudinal axis of the wing and are spaced apart within the core material 49. The outer tubular members 52 and 53 which are secured at both ends of the mold or frame may carry electrical wires and hydraulic fluid piping while the inner member 54 may conduct one or more molding materials to be dispensed within the mold during the molding procedure.

It is noted that the apparatus of FIGS. 1-3 may also be modified for the molding of composite articles in a number of steps whereby a first mold is used to produce a first unitary or composite molding and thereafter, either a portion of the first mold retains the molding therein while another mold member is assembled with acid portion to define a second molding cavity with the first portion and the molding retained therein after which further material is molded onto the first portion by introducing same into the new mold cavity through either the tubular member forming part of the first portion, a second tubular member disposed in the new mold cavity or through an opening to the newly formed mold assembly. By using this technique employing one or more molds or a mold which is partially disassembled and replaced with a new mold member, relatively complex, composite molded articles may be produced with a minimum amount of labor required to fabricate same.

In molding particular articles by means of apparatus of the type described, one or more additional procedures may be employed to form the composite molding. For example, after charging a first or second molding material into the cavity of the mold as described or otherwise, hot air or gas may be introduced through the inlet 31 of FIG. 1 and into the mold cavity through the openings 27 in the tubular member 26". Said hot gas may be circulated therein to heat the molding material as the mold rotates so as to rapidly set or cure same assuming that the molding material is of a thermosetting nature. If the molding material introduced through the inlet lines 31, 29 and the conduit 26" is a thermoplastic material such as a powdered polyethylene, polyamide, polypropylene, polycarbonate or other suitable resin, it may be distributed about the wall of the mold and heated to a molten state by introducing hot air simultaneously therewith into the mold cavity through the pipe 26" and/or by heating the wall of the mold by introducing a heated fluid through the passageways 37 extending through the mold wall adjacent the cavity.

In another form of the invention, the molding material is a resin such as a polyester resin which is curable or settable by means of radiation, said radiation may be provided by one or more devices supported within the hollow tube 26" such as sources of intense atomic radiation, electron beam generating devices or the like. Or, a radioactive gas or vapor may be introduced through the inlet conduit 31 and the tube or pipe 26" into the mold, circulated through the mold cavity and removed therefrom through the same conduit or an auxiliary conduit extending through the mold or through the pipe 26 so as to rapidly cure the molding material.

FIG. 3' shows, in cross section, details of one form of the strut or stiffening member 26" extending through the wing or flight member as shown in FIG. 2. The tube 26" is a single extrusion having internal reinforcements and wall members deviding said tube into four chambers denoted 26m, 26n 26o and 26p. Chamber 26m is utilized for delivering molding material to the mold cavity and the outer wall portion thereof is provided with said delivery openings 27 along the length of the tube. Accordingly chamber 26m is connected to the rotary coupling means provided in FIG. 1 and the supply of one or more molding materials as described. Additional chambers similar to 26m may also be provided in the tube 26" each for the delivery of an additional molding material as described and/or for the delivery of one or more catalysts for molding material or resins requiring same. The chamber 26n which is centrally disposed in the extrusion is shown containing wires and tubing, the former being utilized to operate electrical solenoids and servo motors and to conduct electrical energy to lamps and transducers located in or on the wing and the latter being employed to conduct pressurized fluids for operating hydraulic actuators, wing heating or deicing or cooling purposes. Such piping may extend through the wall of the tube 26" and connect to other tubes located in or on the wing. The chambers 26o and 26p may be utilized for circulating hot and cold gas through the molding cavity during molding to respectively heat set or render the molding material molten and to cool same during the molding cycle as described. Separate chambers such as 26o and 26p may also be employed to conduct heat transfer fluid to the wing leading and trailing edges during operation of the aircraft by connecting proper lead tubing thereto. Thus the single strut tube 26" serves many functions both during molding and in the operation of the assembly molded thereto.

To rapidly cool or set a thermoplastic molding material dispensed against the wall of the mold cavity or the previous shell-like molding molded thereagainst, a coolant gas or liquid may be introduced through the pipe 26" by the means described and circulated or temporarily applied to the serve the interior of the hollow molded article. A liquid coolant may also be circulated through the passageways 37 in the mold wall itself.

If the molding material introduced into the mold is a powdered ceramic material which requires a high temperature to set or sinter same, such high temperature may be generated by suitable radiation generating means located in the tube 26" or by burning a gas injected into the mold cavity 22 through the tube 26" and circulated through the mold cavity while the mold is rotated and/or oscillated to distribute the powdered material about the surface of the mold cavity.

FIG. 4 shows a modified form of mold insert for molding a hollow, internally reinforced structure such as an aircraft wing. The insert includes one or more wing ribs 55 supported by one or more tubular members, one of which 56 is shown. The tubular members extend across the mold cavity as described and support the ribs 55 away from the wall of the mold so that a space or volume exists between the periphery of each rib and the wall of the mold. The volume between each rib in the wall mold is preferably such that the outer skin or shell 51 solidifies not only against the wall of the mold cavity but also against at least the periphery of each rib so as to form an integral continuous structure between the shell 51 and the rib upon solidification of the plastic. The volumes between ribs and enclosed by the outer shell 51 may or may not be filled with a filler material such as a cellular plastic and, in accordance with such structure, the ribs thus support the outer shell portion 51 of the molding.

As a supplement or in addition to serving as a conduit for passing heat transfer fluid such as hot gases through the mold, the tube 26 may also mount one or more resistance heating elements therein which, when electrically energized from the exterior of the mold, may be utilized to transfer heat from within the mold cavity to the molding material disposed against the wall of the mold cavity so as to more rapidly set or solidify same then as a thermosetting resin. If the molding material is a thermoplastic resin introduced in powdered form into the mold, the heating elements may be operative to melt the molding material as it is dispensed against the surface of the mold cavity wall to form the hollow molding thereof after which cool air or gas may be injected and circulated through the mold cavity as described.

In FIG. 5 is shown a control diagram for a molding apparatus of the type described. Controlled signals are generated sequentially on a plurality of outputs 59' on a program controller and are fed to operate the controls of the various described servo devices such as motors and solenoids. The program controller 59 may comprise a conventional multi-circuit timer operative to pass electrical energy from a power supply PS on the various output circuits 59' thereof to sequentially operate the various motors and solenoids for predetermined times during a molding cycle. The program controller 59 may also comprise a self-recycling signal generator such as a magnetic recording device operative to generate reference signals on the various outputs thereof which reference signals are operative to predeterminately control the various motors and servos for predetermined time intervals during the molding cycle. Digital as well as analog automatic control techniques may also be utilized, such as digital or hybrid control computers.

To describe the automatic control system of FIG. 5, a typical molding cycle includes generation of a first signal on an output 59'-1 of the controller 59 which signal is passed to a controller 38-C for the mold rotating motor 38 and may be utilized to effect rotation of the mold at either a speed determined by the fixed operating speed of the motor 38 or determined by the magnitude of the reference signal generated on the output of program controller 59 and fed to control means 38-C which is operative to regulate the speed of the motor in accordance with the magnitude of the reference signal received thereby.

A second reference or command signal is generated on output 59'-2 of program controller 59 and fed to operate the platform oscillating servo or cylinder 33 by energizing the controller or solenoid 33-C therefore. So as to suitably and predeterminately cause the platform 12 to oscillate up and down so as to predeterminately vary the angle of axis of rotation of the mold. A third command signal is generated on a output 59'-3 of the program controller 59 and fed to a controller 60-C for a servo motor 60 for operating a manipulator (not shown) for predeterminately placing the tube or frame 26 across the open mold. A fourth reference signal may also be generated and fed to operate a manipulator for opening and closing the mold in the proper sequence and another reference may also be generated on an output (not shown) by program controller 59 for automatically opening and closing the mold to permit the molding to be removed and a new preform to replace same prior to the next molding cycle.

During rotation of the mold, further reference or control signals may be generated on respective outputs of the program controller 59 for controller the admission of one or more quantities of molding material to the mold cavity and, in certain instances for controlling the admission of hot and cool air and the circulation of said air through the mold cavity for the purposes of curing or melting thermosetting or thermoplastic materials in the mold and, thereafter by admitting cool air or refrigerant, cooling or hardening the molding material disposed against the wall of the mold to solidify the hollow molding. Steam may also be introduced and circulated through the mold during the molding procedure in the event that it is desired to utilize same to expand an expandable plastic material injected into the mold. Motors 63 and 65 which respectively operate compressors or pumps 62 and 64 for hot and cold fluids to be circulated through the mold cavity are respectively controlled by signals generated by program controller 59 on the outputs 59'-4 and 59'-6 thereof. An output 59'-5 extends to control a solenoid 61 operating a two-way valve for admitting the heat transfer fluid from either the compressor or pump 62 for 64. The fluid is passed to an inner duct 26x of the pipe or tube 26 extending across the mold cavity as described. The fluid passes through a radial opening 27a to the exterior of the pipe 26 and circulates through the mold cavity 22 to an opening 27b in an outer chamber 26y of the tube 26 along which it flows to an opening 27c in the wall of the duct 26 and located exterior of the mold. Hence the heat transfer fluid may circulate through the mold cavity and return to the atmosphere or may be drawn back through the inner duct 26x, the valve separated by solenoid 61 and the line 66 to the compressor or pump, by reverse operation of said pump.

Cold air or refrigerant may be pumped by a compressor 64 operated by motor 65 through the valve 61V and inner duct 26x to the mold cavity and circulated as described for setting or cooling the molding to reduce cycle time. Similarly, cool heat transfer fluid may be pumped through the walls of the mold by means of suitable ducting extending to the pipe or tube 26 and the circulation of the latter controlled by the program controller by computer 59.

Motors 43M, 44M and 45M operate pumps or compressors located in the supply systems 43, 44 and 45 for supplying different molding materials to the mold and simultaneously and/or sequentially during the molding cycle. Each of these motors is controlled by either gating electrical energy thereto from the power supply PS thereby generating respective reference signals on the outputs 59'-8 to 59'-10 of the controller 59 and passing said signals to activate automatic contollers for the motors. If each of the motors is a so-called induction motor which is controlled by a controller comprising a silicon controlled rectifier and a triac control, then the speed of the motor may be predeterminately controlled by predeterminately varying the voltage fed thereto. Accordingly, by generating a particular reference voltage on the output of the control signal generator 59 utilized to effect control of the particular motor, the speed of said motors may be predetermined and may also be predeterminately varied during a molding cycle to vary the rotation and oscillation of the mold as well as the rate-of-flow of molding material admitted thereto. Depending on the temperature of the mold and the amount of previously deposited molding material, in order to optimize the molding cycle, it may be preferable to vary the rate-of-flow of a particular molding material to the mold as the cycle progresses. Accordingly, by the means provided hereinabove and illustrated in FIG. 5, both the timing and the rate-of-flow of different molding materials may be varied during a molding cycle.

Notation 66 refers to a servo such as a stepping solenoid operative to control valve 41 to admit one or more of the molding materials caused to flow by the controlled operation of the motors 43M, 44M and 45M. Also shown in FIG. 5 is a motor 70M controlled in its operation by a signal or voltage provided on the output 59'-11 of the controller 59 and operative to activate a pump 70 for pumping heat transfer fluid through the passageways in the wall of the mold described and illustrated in FIG. 1.

In FIG. 5, the molding material is injected from the rotary coupling 30 through one or more openings 27e in a second outer chamber 26z of the tube 26 and after flowing through said tube, the molding material is injected into the mold cavity through openings 27d in said tube.

For the purpose of simplifying the diagram, FIG. 5 does not show power supplies connected to the electrically operated devices but it is assumed that such correct power supplies are connected on the proper sides of all motors, servos and controls.

There is shown in FIG. 6 details of a mold assembly 70 for molding a hollow body such as an aircraft fusalage having a plurality of body reinforcing components secured within the hollow body during the molding process. One mold half member 70a consisting of a mold block 71 is shown having a cavity 72 defining half the surface shape of the molding formed thereby, the other half being defined by a second mold member 70b when assembled with member 70a as shown in FIG. 7. Predetermined quantities of one or more molding materials of the type described may be disposed in the mold cavity prior to closure of the mold or may be admitted in sequence as described through holes in an injection pipe 75 extending longitudinally through the mold cavity from one end of the mold to the other. This pipe may be operative as described and may be a permanent part of the molding or may be removed therefrom after molding Internal support for the molding is derived from a plurality of bulkheads 76 formed of suitable metal or plastic and supported at predetermined locations along the cavity 72 by one or more pins 79 held in holes 73 in the walls of the molding cavity for either or both the mold members as shown in FIG. 7. The bulkheads designated 76-1 to 76-6 in FIG. 6 preferably, although not necessarily, extend generally at right angles to the longitudinal axis of the mold cavity 72 and the pins 79 extend parallel to the lateral or pitching axis of the molded fusalage to permit the bulkheads and molding to be released from the pins after the mold is opened. The outer ends of the pins 79 thus slidably engage in holes 81 in the periphery 80 of the bulkheads 76 and may number one or a plurality of pins 79 per mold half.

The peripheral surface 80' of the bulkheads 76 is preferably shaped such that, when each bulkhead is properly positioned on its pin supports within the mold there will be a space 82 between the periphery of each bulkhead and the wall of the mold cavity which space is less than the thickness of the wall of the hollow body formed in the mold. Thus the peripheral border portion of each bulkhead 76 will become encapsulated within and retained by the material comprising the molding 89 as shown in FIG. 8 wherein said peripheral portion is shown flared outwardly with a shelf 76' which is embedded in the molded shell thereby anchoring the bulkhead in place and is shown disposed within the shell 84 of the molding 83 to firmly hold same in place.

Also shown in FIG. 6 are plate-like members 77 and 77' attached to and extending between the first two pairs of bulkheads defined by bulkheads 76-1, 76-2 and 76-3, said plates serving not only longitudinally the said bulkheads together but also as floorboards for the cabin of the aircraft. Additional stringers 78 and additional plates similar to 77 and 77' may extend between the other bulkheads to afford longitudinal support thereto and to support auxiliary devices such as landing gear, pumps, motors, instruments, control, the wings, tail sections, piping for hydraulic fluid, fuel and wires. In FIG. 8, two pipes or tubes 86 and 87 extend longitudinally through a plurality of bulkheads 76 while a center tube 87 extends longitudinally through the openings in the bulkheads. The tubes 86 and 87 may serve to support the bulkheads 76 and stiffen the molded assembly, and wires W and piping P for hydraulic fluid utilized in the hydraulic control system for the aircraft flight controls may extend through the tubes.

The molded shell 89 shown in FIGS. 8 and 9 which is integrally rotationally cast or molded about the bulkheads 76 may be formed of a single polymer disposed in the mold as a single charge or a plurality of charges at different times during a molding cycle or may be formed of a plurality of different molding materials each of which is introduced after the previous charge has been solidified by rotational molding. In additional to comprising two or more solid polymers one of which may be fiber reinforced, the inner portion of the shell 89 may comprise a cellular plastic which is expanded in situ against the outer shell either during or after being disposed against the outer portion by rotational movement of the mold. Furthermore, a noncellular plastic may be injected into the mold as described to coat the cellular portion of the shell and form a non-porous inside wall of the shell after the cellular portion has formed or solidified. The same procedures may also be employed to construct wing or flight members in molds of the type shown in FIGS. 1 to 3.

In still another fabrication technique, a shell defining a wing, body or other member may be formed by blow molding a parison in a mold. Thereafter one of a number of additional steps may be employed to render internal support to the blow molding. In one, a filler material such as a self expanding plastic may be injected into the blow molding and expanded to completely fill the interior thereof. In another, a second polymer in a molten condition may be injected into the interior of the blow molding and the mold or molding rotated to predeterminately distribute the second material about the inside of the molding and from a hollow core or support therefore. In a third technique, the blow molding may be cut open and support means such as a tube, strut or assembly of rigid members may be inserted and fastened therein with or without the further in action of additional molding material to fill or form a shell inside the molding as described a variety of articles of manufacture may be produced by means of the apparatus and methods described above. These may include a. Large containers such as tanks having a wall composed of an outer non-cellular plastic skin, an inner layer or shell of cellular plastic bonded by molding inside said skin and an inner skin of non cellular plastic with the volume interof the inner skin being void of molding material and serving as a storage volume for liquids, gas or particulate solid materials. Such large containers may have one or more fluid carrying tubes or ducts molded in situ and extending partly or completely through the molding to stiffen same and serve as an inlet and/or outlet duct for the contents thereof. The inner skin may be attached to or comprise a preformed shell of shell-like container such as an oblong metal drum which is held in the center of the rotational mold by one or more tubes or rods attached thereto and supported by the walls of the mold at opposite sides of the mold cavity.

b. Composite articles such as seats and other furniture made of a composite molding of flexible and rigid plastics and containing one or more structural members such as tubes or rods or supports therefore molded integral within the molding. The core of the composite molding may be formed of resilient cellular plastic such as flexible polyurethan or vinyl foam which is injected into a non-cellular plastic skin which is rotationally molded as described with the legs or supports for the legs of the molding extending across the cavity of the mold and attached to both skin and foam plastic core. A portion of the skin may be heavier or greater in thickness than the upper portion thereof on which a person sits which may be flexible or resilient to permit it to give downwardly when a person sits on the seat. The portion of the skin of greater thickness may be molded around the legs of the seat or the support there or may comprise a plastic of greater rigidity than the plastic comprising the upper skin defining the seat or cushion part of the molding.

c. A vehicle bumper may be molded by the apparatus and methods described having a non-cellular skin defining the outer wall thereof and either completely filled with a flexible cellular plastic core portion molded as described within the skin. An attachment plate, tube or bar or a plurality of same may be molded in situ within the material comprising the skin and/or the cellular plastic core or both and preferably within the rear wall of the bumper. If the core is hollow or has a cavity inwardly of the cellular plastic portion thereof, such cavity may be gas pressurized or filled with a liquid such as water which may serve as shock absorbing means on impact of the bumper with a surface. One or more fasteners or brackets may be welded or otherwise secured to the plate or other device which is secured by molding in the material of the skin or core, for securing the composite molding to the frame or body of a vehicle.

d. Marine floats, buoys, rafts and other devices may be fabricated by molding as described above with each containing a composite wall structure formed of a non-cellular outer and inner skin with a cellular wall portion of substantially greater thickness than the outer and inner wall portions molded in situ therebetween by rotational molding. Stiffening means such as one or more tubes, rods, or assemblies of rigid elements may also disposed in the mold per set or within a protective jacket or container therein to become attached by molding to the composite molded wall. Such molded in tubes or assemblies may also be employed for attaching the marine device to mooring lines and/or other devices.

e. Playing pieces such as balls may be molded with a non-porous plastic outer skin and a core portion made entirely of a flexible or rigid cellular plastic and/either completely filling the core of the molding or partially filling same.

The apparatus provided herein may be used to mold a ball which contains a resilient or hard outer skin and is completely filled with rigid or flexible cellular plastic. It may also be used to mold a ball having an outer skin of non-cellular plastic and a core of cellular plastic and non-cellular plastic. The outer layer of the core may comprise a cellular plastic shell bonded to and molded within the outer skin or shell and supporting a sperically shaped inner core of non-cellular plastic and of greater density than the cellular plastic shell material. The non-cellular plastic portions may be rigid and/or flexible in structure as may the cellular plastic portion. A ball may be molded of a rigid non-cellular plastic skin such as rigid polyurethane, high density polyethylene or polypropylene, an inner layer of flexible cellular plastic such as flexible polyurethane molded in situ within the rigid non-cellular plastic skin and a spherically shaped core of greater density than the cellular plastic and molded in situ therein of non-cellular plastic by means of apparatus of the type described, or preformed and placed within the center of the mold cavity and held therein during the rotational molding of the skin and the molding of the cellular plastic thereabout. The rigid tubular member through which the core plastic or plastics are injected may be retained in the molding or removed therefrom after injection of the molding materials into the mold cavity or inside the rotationally molded skin material. The cavity formed by the tubular member when it is removed may be filled with plastic injected through the tubular member as it is removed from the molding or at some time thereafter.

I claim

1. A molding apparatus comprising:
a multiple-part mold defined by at least first and second mold members shaped to close together and to define a molding cavity therebetween in which cavity an article may be molded to shape,
first support means for rotatably supporting said multiple-part mold for rotation about a first axis,
means for varying the attitude of said first support means during the rotation of said mold thereon,
an elongated tubular member,
means for supporting said elongated tubular member fixed within said cavity of said multiple-part mold with said tubular member being detachably secured to said mold and extending from one wall of said mold,
supply means for a fluent molding material, said supply means being connected to said tubular member,
means for causing the flow of said fluent molding material to said tubular member from said supply means,
said tubular member having an opening therein to permit molding material to flow therefrom into said mold cavity, and
means for power rotating said mold about said first axis to distribute molding material about the surface of said mold cavity wall and the portion of said tubular member adjacent said wall of said mold to permit said molding material to solidify in situ on the wall of the mold and against said tubular member so as to form a composite molding defined by said hollow body with the tubular member integrally secured to the wall of said hollow body by the soldified molding material surrounding same near the mold wall and wherein both said hollow body and said tubular member are removeable from said mold.

2. A molding apparatus in accordance claim 1, said supply means for fluent material comprising a supply of molding material and including means for flowing said molding material through said tubular member into said mold cavity to form the molded article thereof.

3. A molding apparatus in accordance with claim 1, said means connecting said supply means to said tubular member comprising a conduit and means for uncoupling said conduit from said mold during the rotation thereof and recoupling said conduit to said mold to permit the flow of molding material into the mold through the tubular member while the mold is not rotating.

4. A molding apparatus in accordance with claim 3, including rotary coupling means between said supply means of molding material and said tubular member and operative to permit the injection of molding material through said tubular member into the mold cavity during the rotation of the mold.

5. A molding apparatus in accordance with claim 4, said tubular member having a plurality of openings for admitting molding material to the interior of the world and means for clearing molding material from said openings during the molding operation to permit the admission of fresh molding material therethrough into the mold cavity.

6. A molding apparatus in accordance with claim 1 including means for admitting both a fluent molding material and a heat transfer gas through said tubular member into the mold during a molding cycle.

7. A molding apparatus in accordance with claim 1 including a source of gas at elevated temperature connected to said tubular member, and means for controlling the flow of said gas at elevated temperature through said tubular member into the molding during the molding cycle for solidifying the molding material disposed within the mold.

8. A molding apparatus in accordance with claim 1 including a source of gas at reduced temperature connected to said tubular member and means for controlling the flow of said gas at reduced temperature through said tubular member into the mold cavity during a molding operation so as to rapidly cool the molding material disposed against the wall of the mold cavity.

9. A molding apparatus in accordance with claim 1, said tubular member being supported at opposite ends of said mold cavity by the walls of the mold and containing fastening means for fastening other members thereto and the molding formed about said tubular member.

10. A molding apparatus comprising:
a multiple-part mold defined by a plurality of mold members which are operable to close together and define a molding cavity when the mold is closed, in which cavity an article may be molded to shape,
first support means for rotatably supporting said multiple-part mold for rotation about a first axis,
means for varying the attitude of said first support means during the rotation of said mold thereon,
an elongated tubular member,
means for supporting said elongated tubular member fixed within said cavity of said multiple-part mold with said tubular member being detachably secured to said mold and extending into said cavity,
means for flowing a first molding material to said mold cavity,
means for power rotating said mold about said first axis to distribute said first molding material about the surface of said mold cavity wall and the portion of said tubular member adjacent said wall of said mold to permit said molding material to solidify in situ on the wall of the mold and against said tubular member so as to form a composite molding defined by said hollow body with the tubular member integrally secured to the wall of said hollow body by the solidified molding material surrounding same near the mold wall, and
means for flowing a second molding material into the interior of said hollow body and solidifying said second molding material in situ against the inside surface of said hollow body to form a composite molding of said first and second molding materials.

11. A molding apparatus in accordance with claim 10 including means for expanding said second molding material into a cellular mass against the inside surface of said hollow body.

12. A molding apparatus in accordance with claim 11 including means for controlling said means for power rotating said mold to terminate the rotation of said mold while said second molding material expands into a cellular mass therein.

13. A molding apparatus in accordance with claim 11 wherein said means for flowing said second molding material into the interior of said hollow body comprises means for admitting said second molding material to said tubular member and means for flowing said second molding material from said tubular member to the cavity of said mold.

14. A molding apparatus in accordance with claim 10 including means for flowing a heat transfer fluid through said tubular member into the interior of said mold after said first molding material has been admitted to said mold cavity and is distributed about the wall of the mold cavity so as to rapidly cause said first molding material to set against said mold cavity wall and to form said hollow body.

15. A molding apparatus in accordance with claim 14 including means for circulating said heat transfer fluid through said mold cavity and returning it to said tubular member after transferring heat with respect to the molding material in said mold.

16. A molding apparatus in accordance with claim 13 wherein said means for flowing said second molding material into the interior of said hollow body includes at least one opening in said tubular member aligned with the interior of said hollow body and through which opening said second molding material is made to flow from said tubular member into said interior of said hollow body.

* * * * *